(12) United States Patent
Egami

(10) Patent No.: US 9,325,213 B2
(45) Date of Patent: Apr. 26, 2016

(54) MOTOR CONNECTING MEMBER AND MOTOR DEVICE

(71) Applicant: Hitachi Metals, Ltd., Tokyo (JP)

(72) Inventor: Kenichi Egami, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 81 days.

(21) Appl. No.: 14/250,873

(22) Filed: Apr. 11, 2014

(65) Prior Publication Data

US 2014/0306562 A1   Oct. 16, 2014

(30) Foreign Application Priority Data

Apr. 15, 2013   (JP) .................................. 2013-085288

(51) Int. Cl.
   *H02K 3/50*   (2006.01)
   *H02K 5/22*   (2006.01)

(52) U.S. Cl.
   CPC . *H02K 3/50* (2013.01); *H02K 5/225* (2013.01)

(58) Field of Classification Search
   CPC ... H02K 3/552; H02K 5/225; H02K 2203/09; H02K 3/50; H02K 2203/06
   USPC ............................................................ 310/71
   See application file for complete search history.

(56) References Cited

U.S. PATENT DOCUMENTS

| | | | |
|---|---|---|---|
| 4,177,397 A * | 12/1979 | Lill .................................. | 310/71 |
| 7,476,995 B2 * | 1/2009 | Uchiyama et al. .............. | 310/71 |
| 2009/0108688 A1 * | 4/2009 | Miura .............................. | 310/71 |
| 2010/0201212 A1 * | 8/2010 | Urano et al. .................... | 310/71 |
| 2011/0175472 A1 * | 7/2011 | Koike et al. ..................... | 310/71 |
| 2012/0126646 A1 * | 5/2012 | Nakagawa et al. ............. | 310/71 |

* cited by examiner

*Primary Examiner* — Dang Le
*Assistant Examiner* — Leda Pham
(74) *Attorney, Agent, or Firm* — Roberts Mlotkowski Safran & Cole, PC

(57) ABSTRACT

A motor connecting member, which connects a motor winding and a terminal block, includes a terminal to be connected to the terminal block, a winding connecting portion to be connected to the motor winding, and an extended portion extending between the terminal and the winding connecting portion. The extended portion is made by plastically deforming a single wire having a circular cross section, and is curved in a circular arc shape in at least one portion between the terminal and the winding connecting portion, and the at least one curved portion comprises a narrower conductor width in a radial direction than a diameter of the single wire before the plastic deformation.

6 Claims, 11 Drawing Sheets

MOTOR CONNECTING MEMBER AND MOTOR DEVICE

The present application is based on Japanese patent application No. 2013-085288 filed on Apr. 15, 2013, the entire contents of which are incorporated herein by reference.

BACKGROUND OF THE INVENTION

1. Field of the Invention

This invention relates to a motor connecting member which connects a winding of a motor and a terminal. It also relates to a motor device including that motor connecting member.

2. Description of the Related Art

As a conventional motor connecting member, an interconnecting member as disclosed in JP-A-2012-110188 has been known. This interconnecting member is used to electrically connect together an output terminal of a bus bar, which is connected to a plurality of coils in a motor case for accommodating a rotor and a stator, and an external connection terminal. The external connection terminal is connected to, e.g., a terminal block, and is provided with a motor current from an inverter.

The stator has a stator core made of a magnetic material, an insulator made of an insulating material, and a coil. The stator core comprises coupled divided cores, which are formed by laminating a plurality of steel plates, and includes a cylindrical core back, and a plurality of teeth, which are radially provided around an inner side of the core back. The teeth of the stator core are mounted with the insulator therearound, and the coil is formed by winding motor windings around the teeth respectively with the insulator therebetween. The motor windings are made of an electrically conductive wire such as an enameled copper wire or the like.

The motor windings wound around the teeth are embedded in a molded resin, excluding respective both ends thereof. The respective both ends of the motor windings are drawn out to an opening side of the motor case, and are connected to the bus bar held by an annular holding member formed of a resin.

The interconnecting member is provided with a terminal member, which is connected to the output terminal of the bus bar, and a connecting wire, which is fixed to the terminal member and connected to the external connection terminal. The connecting wire comprises a stranded wire made from a plurality of wire rods bundled together.

The interconnecting member is high in flexibility because the connecting wire comprises the stranded wire. Therefore, even when the connecting wire varies in length due to its expansion or contraction caused by a temperature variation, the interconnecting member can absorb its length variation by flexure of the connecting wire, and thereby prevent stress from acting on its portion connected with the external connection terminal or the motor windings. Further, even when a relative location between a terminal block for the external connection terminal to be fixed thereto and the motor windings varies, the interconnecting member can absorb this location variation by flexure of the connecting wire.

Refer to e.g. JP-A-2012-110188.

SUMMARY OF THE INVENTION

However, when the above described interconnecting member has been applied to e.g. a motor for a vehicle driving source, swinging of the connecting wire has resulted from vibration due to the connecting wire being composed of the stranded wire, and has been likely to cause breaking of some of the wire rods due to long-term use thereof. Further, in view of the swinging of the connecting wire, in order for no contact between the connecting wire and the members therearound to occur, the connecting wire and the members therearound have been likely to be required to be spaced wide apart, leading to an increase in device size.

Accordingly, it is an object of the present invention to provide a motor connecting member, which is capable of suppressing swinging due to vibration, and absorbing the effect of electrical conductor expansion and contraction caused by temperature variations, or the effect of variation in relative location between a motor winding and a terminal block. It is another object of the present invention to provide a motor device including that motor connecting member.

(1) According to one embodiment of the invention, a motor connecting member, which connects a motor winding and a terminal block, comprises:

a terminal to be connected to the terminal block;

a winding connecting portion to be connected to the motor winding; and an extended portion extending between the terminal and the winding connecting portion, wherein the extended portion is made by plastically deforming a single wire having a circular cross section, and is curved in a circular arc shape in at least one portion between the terminal and the winding connecting portion, and the at least one curved portion comprises a narrower conductor width in a radial direction than a diameter of the single wire before the plastic deformation.

In the embodiment, the following modifications and changes can be made.

(i) The at least one curved portion of the extended portion comprises a wider conductor width in a direction perpendicular to the radial direction than the diameter of the single wire before the plastic deformation.

(ii) The winding connecting portion is connected by welding to the motor winding.

(iii) The extended portion is consisted essentially of an electrical conductor.

(iv) The extended portion comprises an electrical conductor and an insulating member comprising a resin for coating the electrical conductor.

(2) According to another embodiment of the invention, a motor device comprises:

the above defined motor connecting member, and a motor in which the above motor winding is connected to the above winding connecting portion.

(Points of the Invention)

The motor connecting member and the motor device according to the present invention can suppress swinging due to vibration, and absorb the effect of electrical conductor expansion and contraction caused by temperature variations, or the effect of variation in relative location between the motor winding and the terminal block.

BRIEF DESCRIPTION OF THE DRAWINGS

The preferred embodiments according to the invention will be explained below referring to the drawings, wherein:

FIG. 6A shows a single wire as a material, FIG. 6B shows a state after processing in a first step, FIG. 6C shows a state after processing in a second step, FIG. 6D shows a state after processing in a third step;

DETAILED DESCRIPTION OF THE EMBODIMENTS (The First Embodiment)

Figure 1:
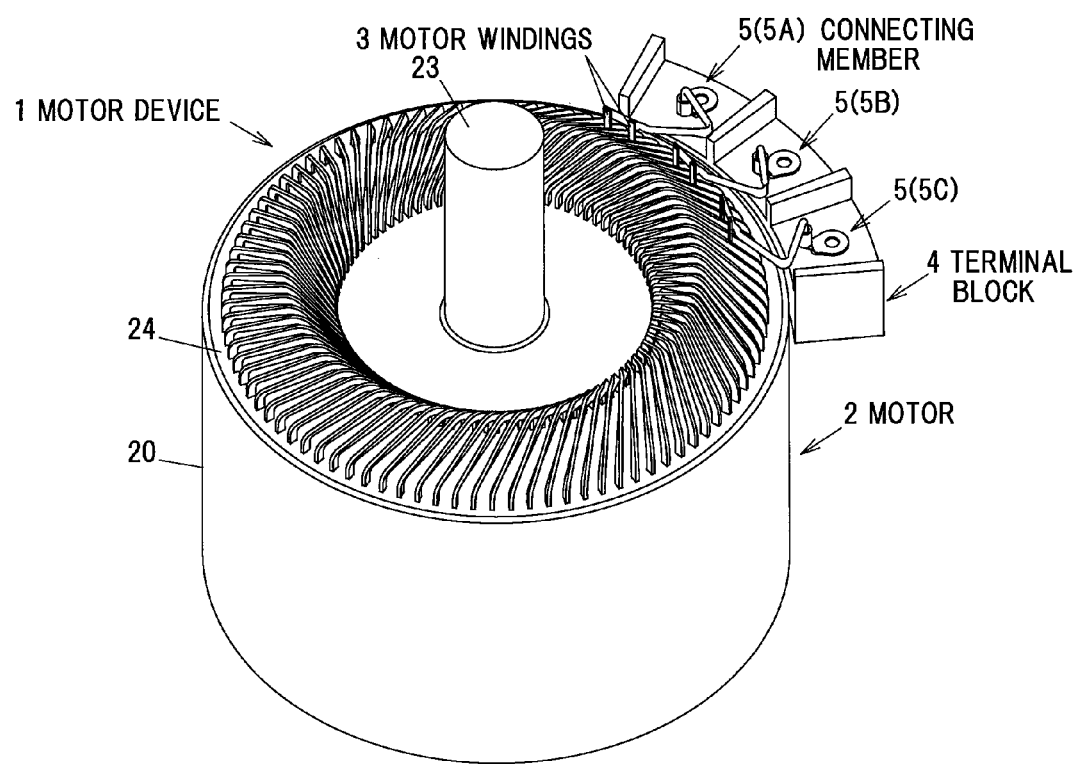
FIG. 1 is a perspective view showing a motor device in the present embodiment.
Figure 2A:
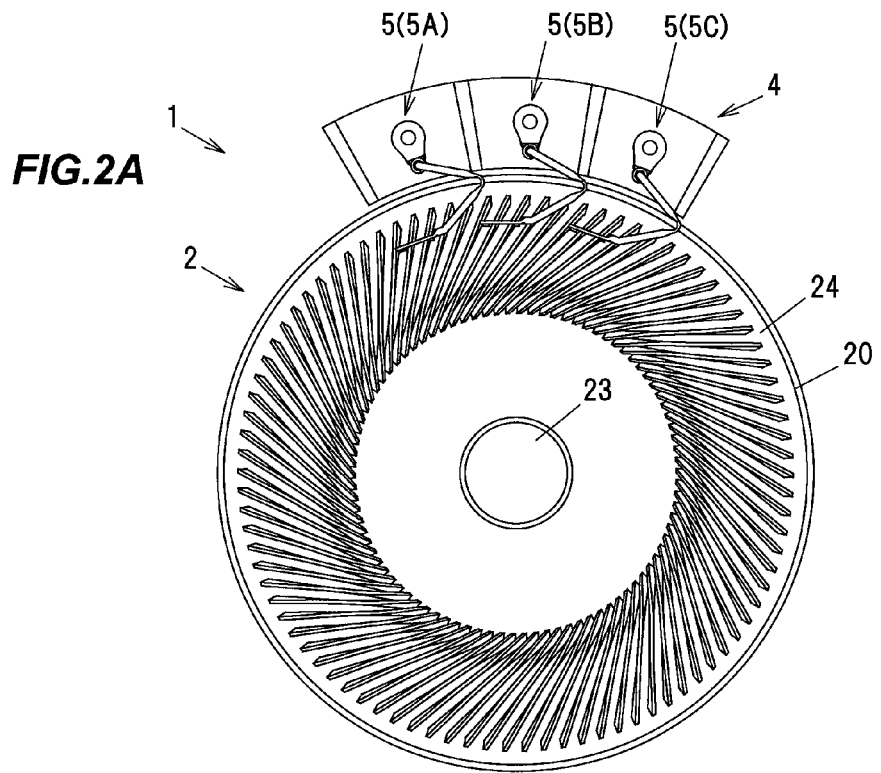
FIGS. 2A and 2B are a plan view and a side view respectively showing the motor device.
Figure 2B:
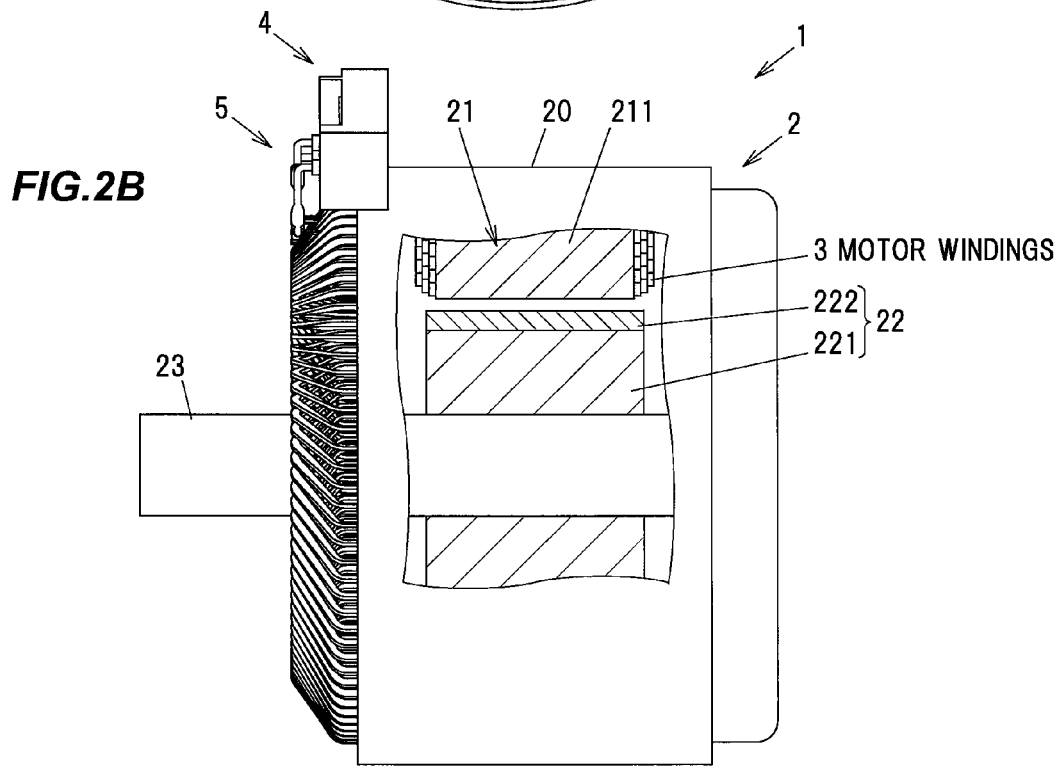

FIG. 1 is a perspective view showing a motor device in the present embodiment. FIGS. 2A and 2B are a plan view and a side view respectively showing the motor device. In FIG. 2B, a cross section in an inner portion of a motor body is shown inside a fracture area surrounded by break lines.

This motor device 1 is configured as including a motor 2, and a plurality (three in the present embodiment) of connecting members 5 for connections between motor windings 3 of the motor 2 and a terminal block 4. The motor 2 includes a bottomed cylindrical motor case 20, an annular stator core 21 received in the motor case 20, a rotor 22 disposed inside the stator core 21, a motor shaft 23 penetrated through the center of the rotor 22 and pivotally supported integrally with the rotor 22, and a covering member 24 made of a molded resin and covering an opening of the motor case 20.

The motor device 1 is used as e.g. a vehicle traction driving source, and is supported by a supporting portion of a vehicle body not shown. Further, the terminal block 4 is connected with a wire harness (not shown) which is connected to an inverter at one end thereof, and in the terminal block 4 the wire harness is electrically connected to the connecting members 5 at the other end thereof. A motor current to be output from the inverter is provided through the wire harness and the connecting members 5 and to the motor 2. The terminal block 4 is fixed to a terminal block fixing portion of the vehicle body (not shown).

The three connecting members 5 are connected by welding to the motor windings 3, respectively. Further, the three connecting members 5 are each formed in the same shape, but in the following description, it is necessary to distinguish them, and therefore the connecting members 5 are described as the first connecting member 5A, the second connecting member 5B, and the third connecting member 5C.

The stator core 21 is made of a magnetic material such as steel or the like. The stator core 21 is provided with a plurality of teeth 211 which inwardly project toward the rotor 22, and the plurality of teeth 211 are wound with the motor windings 3 respectively therearound. In the present embodiment, the motor windings 3 are made of a rectangular electric wire having a rectangular cross section. More specifically, the motor windings 3 are rectangular electrically insulated wires formed with an insulating coating layer made of enamel around an outer surface of a conductor made of copper. The motor windings 3 are partially exposed from the covering member 24 to the outside of the motor case 20, and molded to the covering member 24.

The rotor 22 has a cylindrical rotor core 221 formed with a through hole for the motor shaft 23 to be inserted therein, and a magnet 222 disposed around an outer portion of the rotor core 221. The magnet 222 is provided with a plurality of magnetic poles in such a manner that S and N poles are located alternately. The motor shaft 23 is pivotally supported to the motor case 20 by a bearing (not shown).

Figure 3:
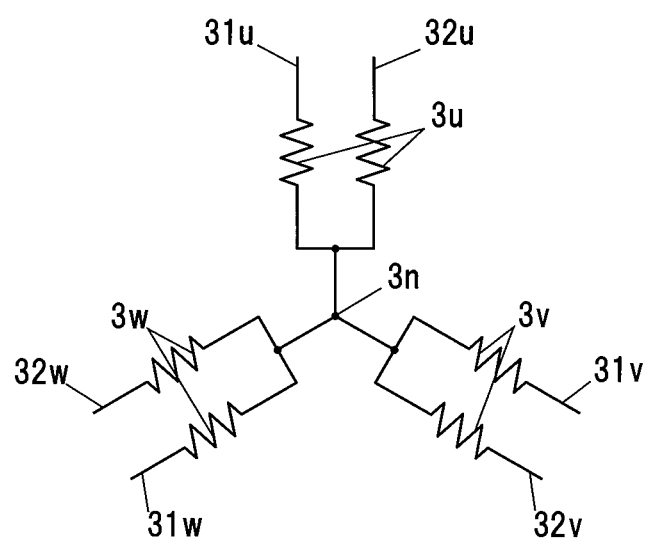
FIG. 3 is a circuit diagram showing a configuration example of an electric circuit in a motor, which is formed by motor windings.

FIG. 3 is a circuit diagram showing a configuration example of an electric circuit in the motor 2, which is formed by the motor windings 3. In the present embodiment, the motor 2 is a three phase AC motor, and the motor windings 3 comprise a U phase winding $3u$, a V phase winding $3v$, and a W phase winding $3w$. The U phase winding $3u$, the V phase winding $3v$, and the W phase winding $3w$ are connected to a neutral point $3n$ in the respective middles. One end $31u$ and an other end $32u$ of the U phase winding $3u$ are provided with a U phase current. One end $31v$ and an other end $32v$ of the V phase winding $3v$ are provided with a V phase current. One end $31w$ and an other end $32w$ of the W phase winding $3w$ are provided with a W phase current.

Figure 4:
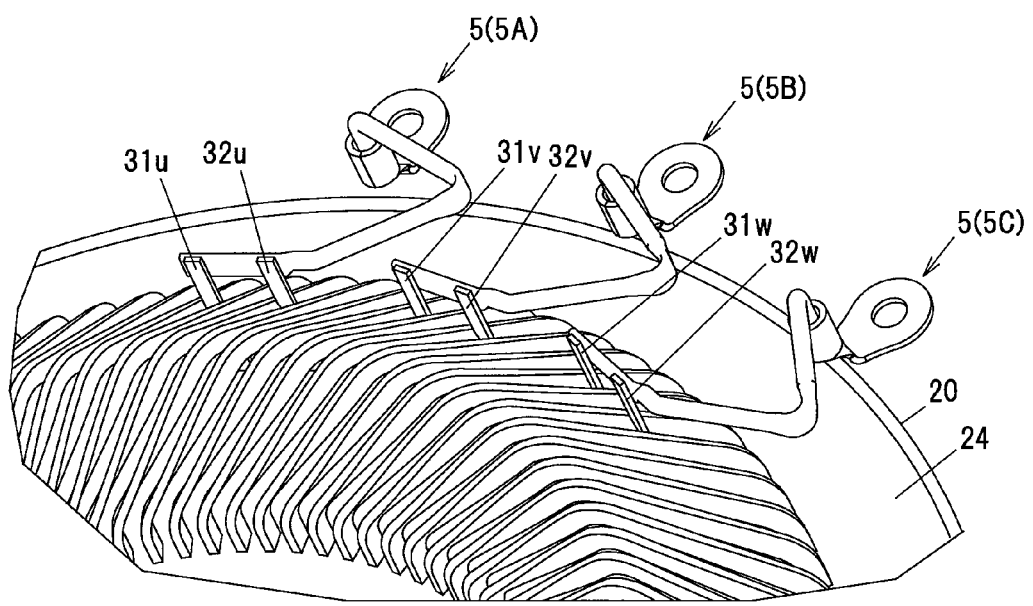
FIG. 4 is a partially enlarged view of FIG. 1 illustrating a peripheral portion of connecting members of the motor device.
Figure 5A:
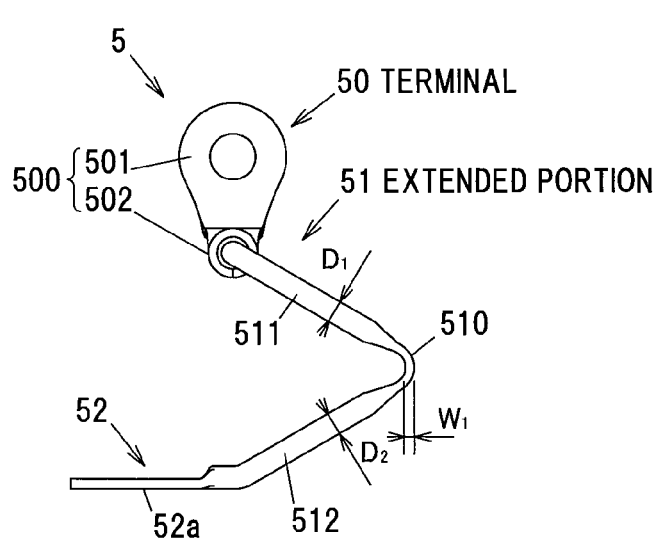
FIG. 5A is a plan view showing a connecting member.
Figure 5B:
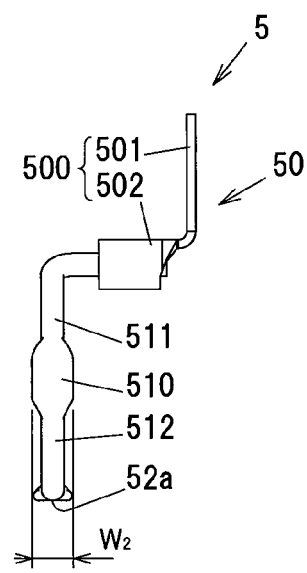
FIGS. 5B and 5C are side views respectively showing the connecting member of FIG. 5A.
Figure 5C:
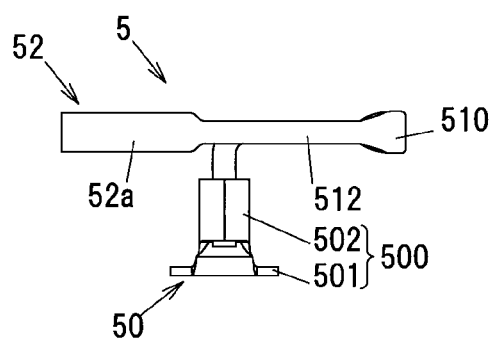

FIG. 4 is a partially enlarged view of FIG. 1 illustrating a peripheral portion of the connecting members 5 of the motor device 1. FIG. 5A is a plan view showing a connecting member 5, FIGS. 5B and 5C are side views respectively showing the connecting member of FIG. 5A.

The ends $31u$ and $32u$ of the U phase winding $3u$, the ends $31v$ and $32v$ of the V phase winding $3v$, and the ends $31w$ and $32w$ of the W phase winding $3w$, are exposed from the covering member 24, and respectively connected to the connecting members 5. More specifically, the ends $31u$ and $32u$ of the U phase winding $3u$ are connected to the first connecting member 5A, the ends $31v$ and $32v$ of the V phase winding $3v$ are connected to the second connecting member 5B, and the ends $31w$ and $32w$ of the W phase winding $3w$ are connected to the third connecting member 5C. Each connection in these portions is done by, e.g., fusing (heat caulking) or TIG (Tungsten Inert Gas) welding. However, the method for connecting the motor windings 3 and the connecting members 5 is not limited thereto.

The connecting members 5 each include a respective terminal 50 to be connected to the terminal block 4, a respective winding connecting portion 52 to be connected to the motor windings 3, and a respective extended portion 51 extending between the terminal 50 and the winding connecting portion 52. In the present embodiment, the terminal 50 is made from a crimping terminal 500, and the extended portion 51 and the winding connecting portion 52 are made by plastically deforming a single wire made of an electrical conductor such as copper or the like having a circular cross section. The crimping terminal 500 has a fixed portion 501, which is fixed to the terminal block 4 by e.g. a bolt, and a crimping portion 502, which is caulked and fixed to one end (an opposite end to the winding connecting portion 52) of the extended portion 51.

In the present embodiment, the extended portion 51 is made of only an electrical conductor, i.e. consisting essentially of an electrical conductor. Here, "made of only an electrical conductor" refers to a state of the extended portion 51 being not covered by an insulating member made of, e.g. resin, but being exposed to the outside. This allows an external force for plastically deforming the extended portion 51 to be applied directly to the constituent electrical conductor of the extended portion 51, thereby accurately plastically deforming the extended portion 51. Incidentally, the surface of the extended portion 51 may be formed with an enamel coating film for insulation. Further, in the case of using an insulating material having such a sufficient strength that breakage is not caused even by plastically deforming the extended portion 51, the extended portion 51 may be covered with an insulating member made of a resin. That is, the extended portion 51 may include an electrical conductor, and an insulating member made of a resin for coating that electrical conductor. The covering of the extended portion 51 with an insulating member made of a resin makes it possible to securely prevent the short-circuiting between the connecting members 5.

The diameter of the constituent single wire of the connecting members 5 is desirably not less than 1.5 mm and not more than 8.0 mm, more desirably not less than 2.0 mm and not more than 6.0 mm. By thus setting the diameter of the constituent single wire of the connecting members 5, it is possible to hold the connecting members 5 in a predetermined shape. This allows suppressing the vibration of the connecting members 5 due to the vibration of the motor, and reducing stresses caused in the connected portions between the winding connecting portions 52 and the motor windings 3, as compared with when the connecting members 5 comprise, e.g. a flexible stranded wire. And this stress reduction allows preventing the detachment of the winding connecting portions 52 from the motor windings 3.

As shown in FIGS. 5A to 5C, the extended portion 51 is curved in an arc shape in at least one portion between the winding connecting portion 52 and the terminal 50. More specifically, the extended portion 51 integrally includes a curved portion 510, which is curved in an arc shape, a first straight portion 511, which extends linearly on the terminal 50 side of the curved portion 510, and a second straight portion 512, which extends linearly on the winding connecting portion 52 side of the curved portion 510. The first straight portion 511 and the second straight portion 512 are oblique in mutually opposite directions with respect to a radial direction of the motor 2. That is, the extended portion 51 is formed in a U shape or V shape by taking the curved portion 510 as a bending point.

The extended portion 51 is flattened in the curved portion 510, and comprises a narrower radial conductor width (conductor width in a radiation direction) $W_1$ of the curved portion 510 than a single wire diameter $\phi$ ($\phi$=diameter $D_1$ and $D_2$ of the first straight portion 511 and the second straight portion 512) prior to plastic deformation. Also, the extended portion 51 comprises a wider conductor width $W_2$ in a direction perpendicular to the radial conductor width $W_1$ of the curved portion 510 than the single wire diameter $\phi$ prior to plastic deformation. In other words, the extended portion 51 is formed in such a manner as to satisfy the relation of $W_1 < \phi < W_2$.

The radial conductor width $W_1$ of the curved portion 510 is desirably not less than 10 percent and not more than 90 percent ($0.1 \times \phi < W_1 < 0.9 \times \phi$) of the single wire diameter $\phi$ prior to plastic deformation. This is because if the conductor width $W_1$ is less than 10 percent of the diameter $\phi$, the strength of the connecting members 5 lowers, while if the conductor width $W_1$ is more than 90 percent of the diameter $\phi$, no advantageous effect of the present embodiment to be described later is achieved. Also, the radial conductor width $W_1$ of the curved portion 510 is desirably not less than 30 percent and not more than 60 percent ($0.2 \times \phi < W_1 < 0.4 \times \phi$) of the single wire diameter $\phi$ prior to plastic deformation. In this range, the advantageous effect of the present embodiment to be described later becomes more prominent while the strength of the connecting members 5 is being suitably held.

In addition, the conductor width $W_2$ in a direction perpendicular to the radial conductor width $W_1$ of the curved portion 510 is desirably not less than 1.5 times the single wire diameter $\phi$ prior to plastic deformation. The conductor width $W_2$ is more desirably 1.5 to 2 times the single wire diameter $\phi$ prior to plastic deformation. By forming the curved portion 510 in this manner, it is possible to prevent the electric current density of the motor current in the curved portion 510 from being excessive.

The winding connecting portion 52 is formed with a flat planar connecting surface 52a which is connected to the ends of the motor windings 3 (the ends 31u and 32u of the U phase winding 3u, the ends 31v and 32v of the V phase winding 3v, and the ends 31w and 32w of the W phase winding 3w). In the present embodiment, the ends 31u and 32u of the U phase winding 3u are together connected to the winding connecting portion 52 of the first connecting member 5A, and the ends 31v and 32v of the V phase winding 3v are together connected to the winding connecting portion 52 of the second connecting member 5B. Further, the ends 31w and 32w of the W phase winding 3w are together connected to the winding connecting portion 52 of the third connecting member 5C.

(Method for Producing the Connecting Members 5)

Here, a producing method for the connecting members 5 is described with reference to FIG. 6. The producing procedure described below is shown as one example of the producing procedure for the connecting members 5, but should not be construed to limit the connecting member producing method in the present invention.

Figure 6A:
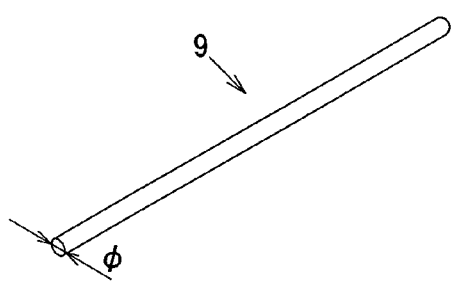
FIGS. 6A to 6D show one example of a producing process for the connecting member.

FIG. 6A shows a single wire 9 as a material for the extended portion 51 and the winding connecting portion 52 of the connecting members 5. The single wire 9 is e.g. a copper wire, and has a circular cross section with a diameter $\phi$ in a direction perpendicular to a longitudinal direction.

Figure 6B:
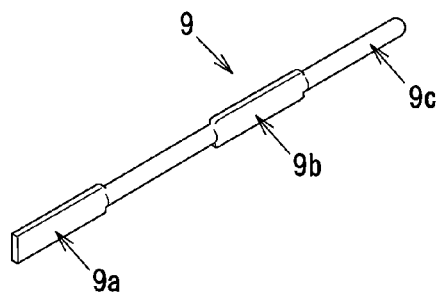

In a first step, as shown in FIG. 6B, one end 9a and a longitudinal middle portion 9b of the single wire 9 are flattened and plastically deformed by applying a pressure thereto, so as to reduce the thickness thereof in the pressure direction, and increase the width in the direction in a direction perpendicular to the pressure direction and the longitudinal direction.

Figure 6C:
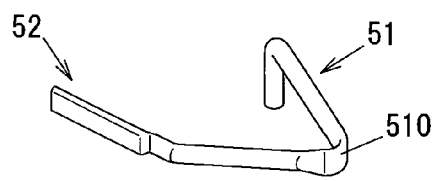
Figure 6D:
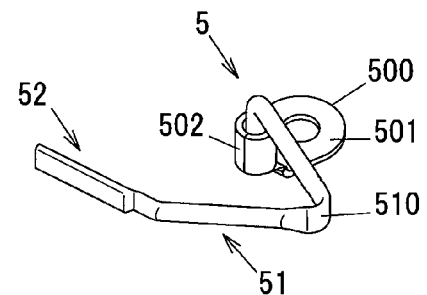

In a second step, as shown in FIG. 6C, the single wire 9 is bent and plastically deformed, to form the extended portion 51 and the winding connecting portion 52. The curved portion 510 of the extended portion 51 is formed in the middle portion 9b flattened in the first step. The one end 9a flattened in the first step is the winding connecting portion 52 of the connecting member 5.

In a third step, the crimping portion 502 of the crimping terminal 500 is caulked to an end of the extended portion 51 (the other end 9c of the single wire 9). This results in the connecting member 5. Incidentally, the curved portion 510 may be formed by bending and plastically deforming the single wire 9 and then radially flattening it. Also, the winding connecting portion 52 (the one end 9a) may be flattened at the same time as the curved portion 510 (the middle portion 9b) or be flattened in a separate step.

(Functions and Advantageous Effects of the Present Embodiment)

In the present embodiment, since the extended portion 51 and the winding connecting portion 52 are formed by plastically deforming the single wire with a circular cross section, it is possible to suppress swinging due to vibration as compared to when using a stranded wire. Further, it is possible to absorb the effect of electrical conductor expansion and contraction caused by temperature variations, or the effect of variation in relative location between the ends of the motor windings 3 (the ends 31u and 32u of the U phase winding 3u, the ends 31v and 32v of the V phase winding 3v, and the ends 31w and 32w of the W phase winding 3w) connected to the winding connecting portion 52 and the terminal block 4.

Figure 7A:
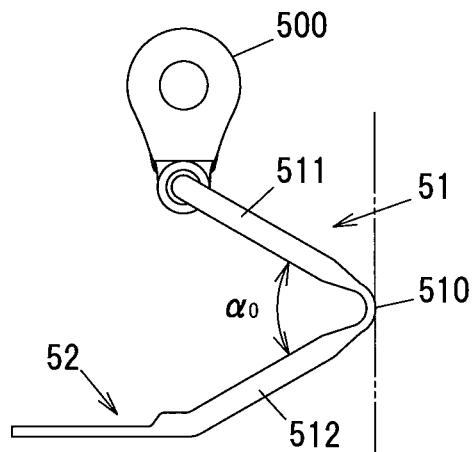
FIG. 7A is a plan view showing the connecting member in an initial state at ordinary temperature.
Figure 7B:
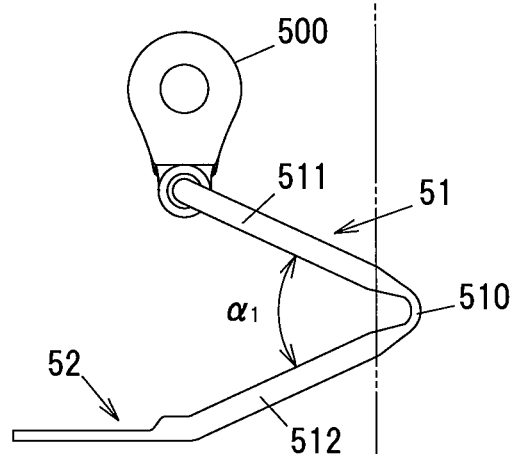
FIG. 7B is a plan view showing the connecting member in a high temperature state.
Figure 7C:
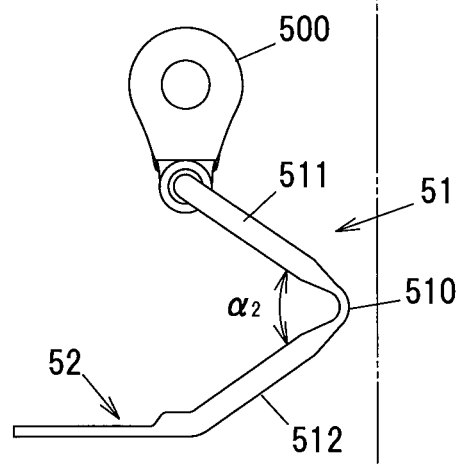
FIG. 7C is a plan view showing the connecting member in a low temperature state.

More specifically, when the connecting member 5 expands due to a temperature rise from an initial state (ordinary temperature state) shown in FIG. 7A, the connecting member 5 deforms as shown in FIG. 7B. When the connecting member 5 contracts due to a temperature drop, the connecting member 5 deforms as shown in FIG. 7C. It should be noted that in FIGS. 7A to 7C, for description, the expansion and contraction amounts are shown exaggeratedly. Thus, stress acting on the connected portion between the end of the motor windings 3 and the winding connecting portion 52 is reduced. The functions and advantageous effects of the present embodiment will be described below by comparison with Comparative examples.

Comparative Example 1

Figure 8:
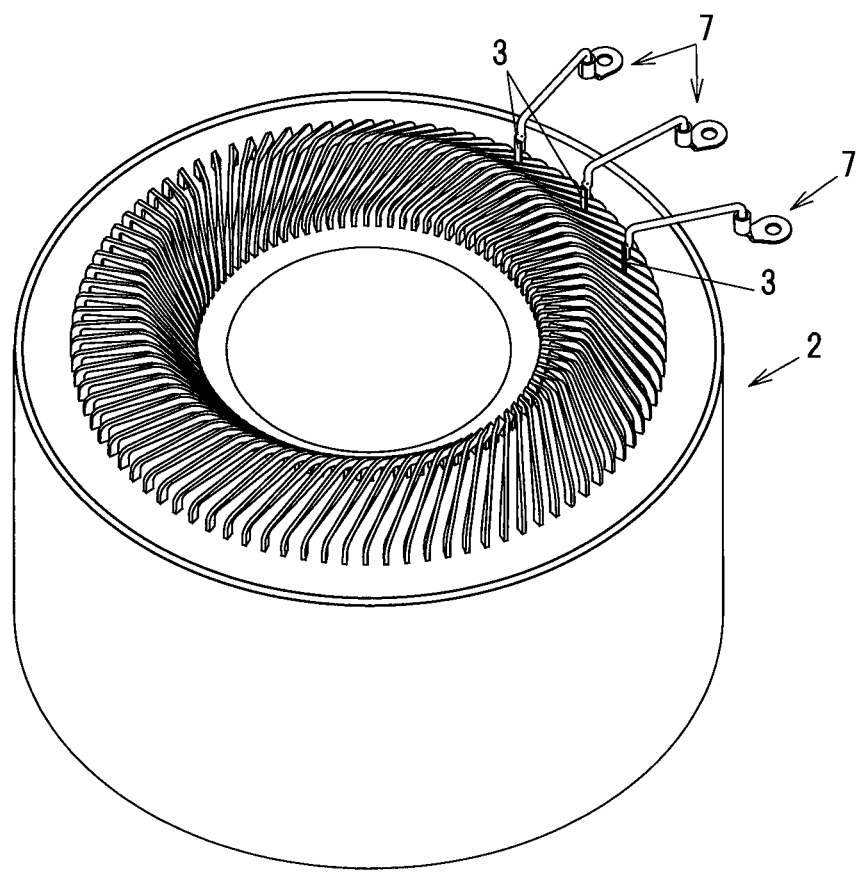
FIG. 8 is a perspective view showing connecting members together with a motor in Comparative example 1.
Figure 9A:
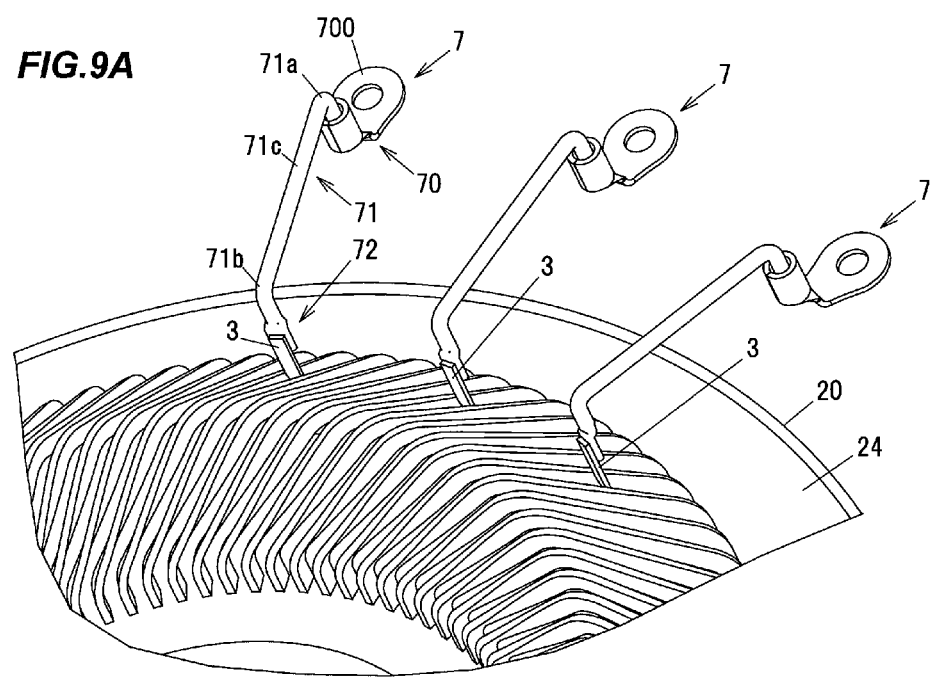
FIG. 9A is a partially enlarged view of FIG. 7 showing an enlarged peripheral portion of the connecting members in Comparative example 1.
Figure 9B:
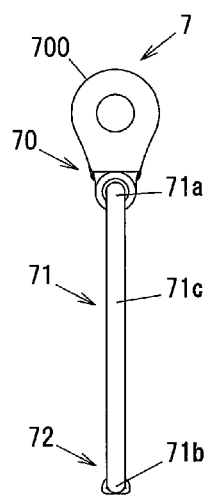
FIGS. 9B and 9C are a plan view and a side view respectively showing the connecting member in Comparative example 1.
Figure 9C:
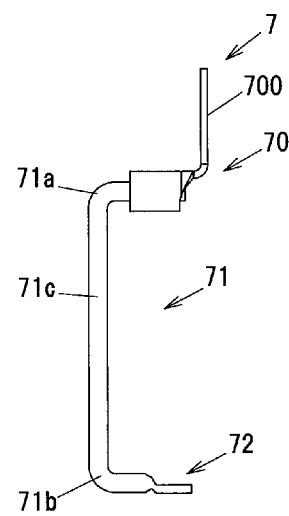

FIG. 8 is a perspective view showing a connecting member 7 in Comparative example 1 together with the motor 2. FIG. 9A is a partially enlarged view of FIG. 6 showing an enlarged peripheral portion of the connecting member 7, FIG. 9B is a plan view of the connecting member 7, and FIG. 9C is a side view showing the connecting member 7.

As with the connecting members 5 in the first embodiment, the connecting members 7 have a terminal 70 made of a crimping terminal 700, an extended portion 71 and a winding connecting portion 72 which are formed by plastically deforming a single wire with a circular cross section, but the shapes of the extended portion 71 and the winding connecting portion 72 are different from the shapes of the extended portion 51 and the winding connecting portion 52 of the connecting members 5 in the first embodiment.

More specifically, the extended portion 71 of the connecting member 7 in Comparative example 1 has two bent portions 71a and 71b that are bent in a direction perpendicular to a terminal 70 side end and a winding connecting portion 72 side end, and a straight portion 71c between both these bent portions 71a and 71b extends in a radial direction of the motor 2. The terminal 70 is fixed to a terminal block not shown, and the winding connecting portion 72 is connected by welding to the motor windings 3 of the motor 2.

When the connecting member 7 expands due to a temperature rise caused by e.g. Joule heat of the motor current, by the straight portion 71c of the extended portion 71 extending in the longitudinal direction, the connecting member 7 deforms so as to expand the distance between the winding connecting portion 72 and the terminal 70. Since the terminal 70 is fixed by a bolt to the terminal block, stress is applied to the connected portion between the motor windings 3 and the winding connecting portion 72 by the deformation of the extended portion 71 due to thermal expansion, the connected portion is likely to be cracked and broken.

Further, such cracking, etc. can be caused not only by expansion due to a temperature increase but also by contraction due to a temperature drop. Further, it can be caused by e.g. a variation in the distance between the terminal block and the motor 2 due to vehicle vibration, etc.

Comparative Example 2

Figure 10A:
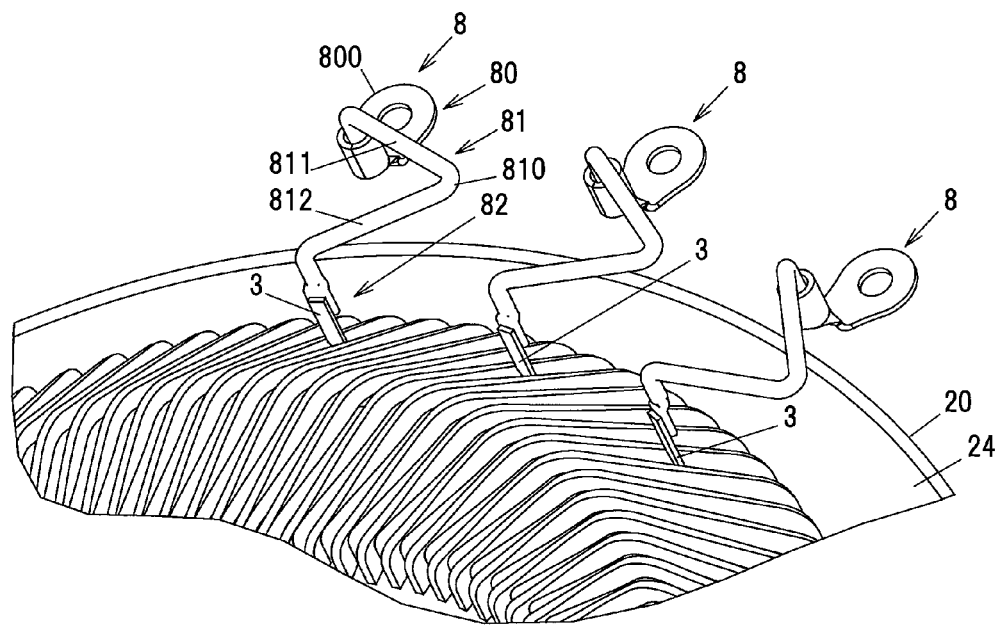
FIG. 10A is a perspective view showing a periphery of connected portions between connecting members in Comparative example 2 and respective ends of motor windings respectively of a motor.
Figure 10B:
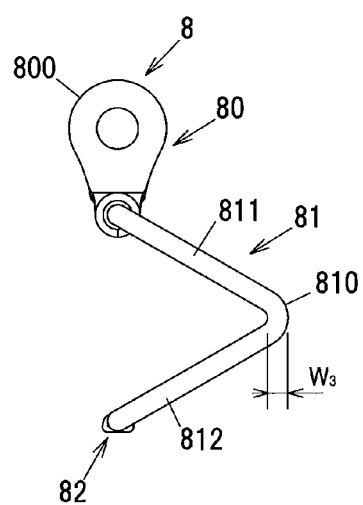
FIGS. 10B and 10C are a plan view and a side view respectively showing the connecting member in Comparative example 2.
Figure 10C:
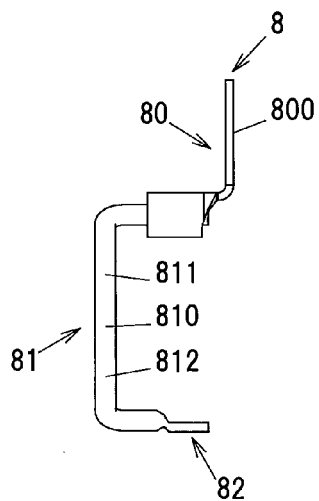

FIG. 10A is a perspective view showing a periphery of the connected portions between the connecting members 8 in Comparative example 2 and respective ends of motor windings 3 respectively of the motor 2, FIG. 10B is a plan view showing the connecting member 8 and FIG. 10C is a side view showing the connecting member 8.

As with the connecting members 5 in the first embodiment, the connecting member 8 includes a terminal 80 made of a crimping terminal 800, an extended portion 81 and a winding connecting portion 82 which are formed by plastically deforming a single wire with a circular cross section, and the extended portion 81 has a curved portion 810 between a first straight portion 811 and a second linear portion 812, but the curved portion 810 is not flattened, and the radial conductor width $W_3$ of the curved portion 810 is equal to the diameter $\phi$ of the single wire before plastic deformation.

As with the connecting member 7 in Comparative example 1, the connecting member 8 in the Comparative example 2 is likely to cause cracking and breakage in the connected portion between the end of the motor windings 3 and the winding connecting portion 82 due to electrical conductor expansion and contraction caused by temperature variations, or variation in relative location between the ends of the motor windings 3 and the terminal block.

On the other hand, since the connecting members 5 in the present embodiment is rolled so that the radial conductor width in the curved portion 510 becomes thin, the curved portion 510 is relatively easily deformed, and even when the extended portion 51 is expanded by heat, stress caused by the expansion is absorbed by the deformation of the curved portion 510.

That is, in the connecting members 5 in the present embodiment, when the extended portion 51 is expanded, the curved portion 510 is deformed as shown in FIG. 7B so that an angle $\alpha_1$ between the first straight portion 511 and the second straight portion 512 is smaller than an angle $\alpha_0$ at ordinary temperature, so as to mitigate the stress acting on the connected portions between the motor windings 3 and the winding connecting portion 52.

Further, when the extended portion 51 of the connecting members 5 is contracted by a temperature drop, the curved portion 510 is deformed as shown in FIG. 7C in such a way that an angle $\alpha_2$ between the first straight portion 511 and the second straight portion 512 is greater than the angle $\alpha_0$ at ordinary temperature, so as to mitigate the stress acting on the connected portions between the motor windings 3 and the winding connecting portion 52.

Furthermore, even if the relative location between the terminal block 4 and the end of the motor windings 3 varies due to vibration or the like, the angle between the first straight portion 511 and the second straight portion 512 is more flexibly changed by the deformation of the curved portion 510 than the connecting member 7 in Comparative example 1 and the connecting member 8 in Comparative example 2, to mitigate the stress acting on the connected portions between the motor windings 3 and the winding connecting portion 52.

Thus, it is possible to prevent the occurrence of cracking and breakage in the connected portions between the motor windings 3 and the winding connecting portion 52.

(The Second Embodiment)

Figure 11A:
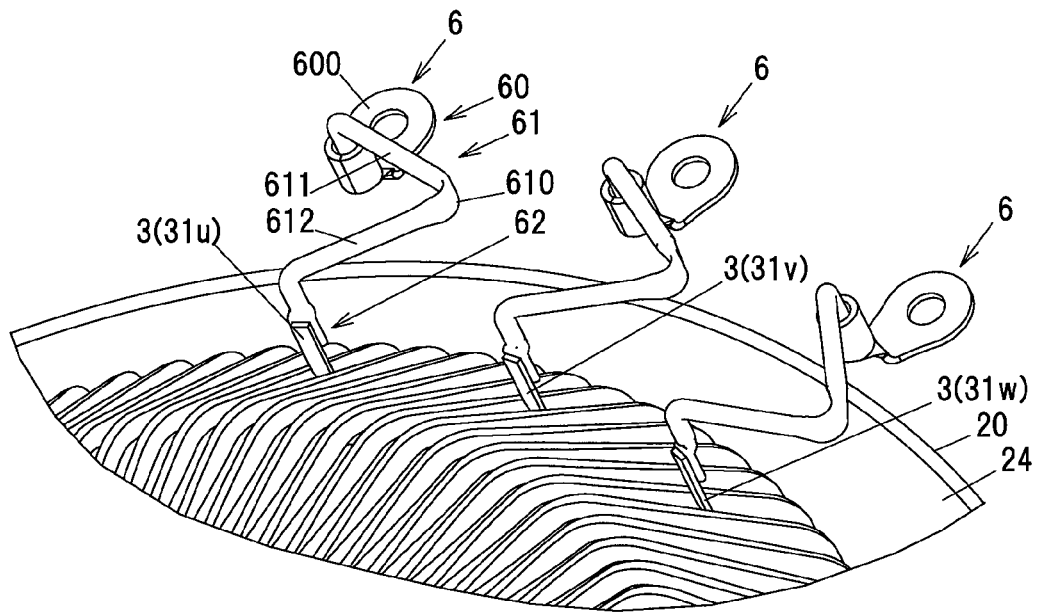
FIG. 11A is a perspective view showing a periphery of connected portions between connecting members in a second embodiment according to the present invention and respective ends of motor windings respectively of a motor.
Figure 11B:
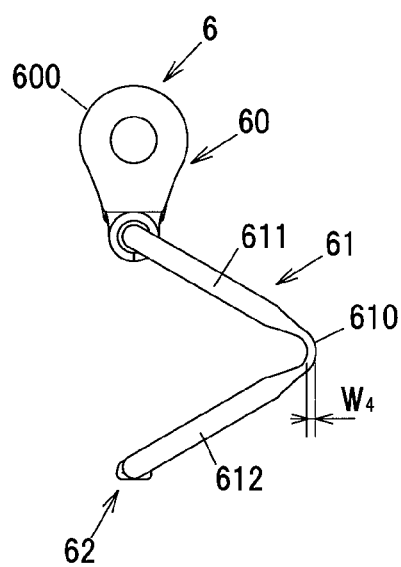
FIGS. 11B and 11C are a plan view and a side view respectively showing the connecting member in the second embodiment.
Figure 11C:
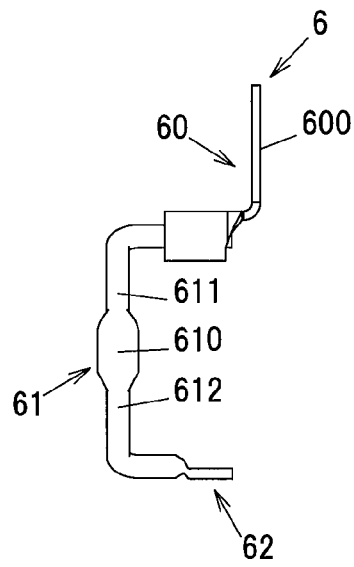

Then, connecting members 6 in the second embodiment of the present invention will be explained. FIG. 11A is a perspective view showing a periphery of connected portions between the ends of the motor windings 3 of the motor 2 and the connecting members 6 in the present embodiment, FIG. 11B is a plan view of the connecting member 6, and FIG. 11C is a side view of the connecting member 6.

As with the connecting members 5 in the first embodiment, the connecting member 6 includes a terminal 60 made of a crimping terminal 600, an extended portion 61 and a winding connecting portion 62 formed by plastically deforming a single wire with a circular cross section, and the extended portion 61 has a curved portion 610 between a first straight portion 611 and a second linear portion 612, but the shape of the winding connecting portion 62 is different from the shape of the winding connecting portion 52 of the connecting members 5 in the first embodiment. Further, as in the connecting members 5 in the first embodiment, the curved portion 610 of the connecting member 6 in the second embodiment is narrower in its radial conductor width $W_4$ than the diameter $\phi$ of the single wire prior to plastic deformation.

In the motor 2 in the present embodiment, in the motor case 20 one end 31$u$ of the U phase winding 3$u$ is connected (shorted) to the other end 32$u$, and the one end 31$u$ is protruded from the covering member 24 and exposed to the outside of the motor case 20. The winding connecting portion 62 is formed parallel to the one end 31$u$ and in the axial direction of the motor 2, and is connected by welding to the one end 31$u$.

Similarly, one end 31$v$ of the V phase winding 3$v$ is connected to the other end 32$v$, and the one end 31$v$ is protruded from the covering member 24 and is connected to the winding connecting portion 62 of the connecting member 6 in the outside of the motor case 20. Further, similarly, one of one end 31$w$ of the W phase winding 3$w$ is connected to the other end 32$w$, and the one end 31$w$ is protruded from the covering member 24 and is connected to the winding connecting portion 62 of the connecting member 6 in the outside of the motor case 20.

The connecting member 6 in the present embodiment can have the functions and advantageous effects similar to the case of using the connecting members 5 in the first embodiment.

(Summary of the Embodiment)

Next, the technical concept that is ascertained from the embodiment described above will be described with the aid of reference characters and the like in the embodiment. It should be noted, however, that each of the reference characters in the following description should not be construed as limiting the constituent elements in the claims to the members and the like specifically shown in the embodiment.

[1] A motor connecting member (5, 6), which connects a motor winding (3) and a terminal block (4), comprising:
a terminal (50, 60) connected to the terminal block (4);
a winding connecting portion (52, 62) connected to the motor winding (3); and
an extended portion (51, 61) extending between the terminal (50, 60) and the winding connecting portion (52, 62),
wherein the extended portion (51, 61) is made by plastically deforming a single wire having a circular cross section, and is curved in a circular arc shape in at least one portion between the terminal (50, 60) and the winding connecting portion (52, 62), and the at least one curved portion comprises a narrower conductor width in a radial direction ($W_1$, $W_4$) than a diameter of the single wire before the plastic deformation.

[2] The motor connecting member (5, 6) according to [1] above, wherein
the at least one curved portion of the extended portion (51) comprises a wider conductor width ($W_2$) in a direction perpendicular to the radial direction than the diameter of the single wire before the plastic deformation.

[3] The motor connecting member (5, 6) according to [1] or [2] above, wherein
the winding connecting portion (52, 62) is connected by welding to the motor winding (3).

[4] The motor connecting member (5, 6) according to any one of [1] to [3] above, wherein
the extended portion (51, 61) is consisted essentially of an electrical conductor.

[5] The motor connecting member (5, 6) according to any one of [1] to [3] above, wherein the extended portion (51, 61) comprises an electrical conductor and an insulating
member comprising a resin for coating the electrical conductor.

[6] A motor device (1), comprising:
the motor connecting member (5, 6) according to any one of [1] to [3] above, and
a motor (2) in which the motor winding (3) is connected to the winding connecting portion (52, 62).

Although the embodiment of the present invention is described above, the embodiment described above should not be construed to limit the invention in the appended claims. It should also be noted that not all the combinations of the features described in the above embodiment are essential to the means for solving the problems of the invention.

Further, the present invention may be appropriately modified and practiced without departing from the spirit thereof. For example, although in the above embodiment it is described that the terminal block 4 is fixed to the vehicle body separately from the motor device 1, the terminal block 4 may be fixed to, e.g., the motor case 20 of the motor 2. Further, although in the above first embodiment it is described that the terminal 50 of the connecting members 5 is made of the crimping terminal 500, the terminal 50 is not limited thereto, but may be formed by bending the other end 9$c$ of the single wire 9 into a ring shape. The same is applied to the connecting member 6 in the second embodiment.

Further, although in the above embodiment it is described that the motor device 1 is used as a vehicle traction driving source, the use of the motor device 1 is not particularly limited.

Furthermore, although in the above embodiment it is described that the motor 2 is the three phase AC motor, it is not limited thereto, but this invention may be applied to motors of various types. Also, the way of winding of the motor windings 3 around the teeth in the stator of the motor is not particularly limited, but various ways of winding, such as distributed winding, concentrated winding or the like, may be adopted.

Although the invention is described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A motor connecting member, which connects a motor winding wound around an annular stator core and a terminal block, comprising:
    a terminal to be connected to the terminal block;
    a winding connecting portion to be connected to the motor winding; and
    an extended portion extending between the terminal and the winding connecting portion,
    wherein the extended portion is made by plastically deforming a single wire having a circular cross section, and is curved in a circular arc shape in at least one portion between the terminal and the winding connecting portion,
    wherein the extended portion integrally includes a curved portion curved in an arc shape, a first straight portion extending linearly on a terminal-side of the curved portion, and a second straight portion extending linearly on a winding connecting portion-side of the curved portion, the second straight portion and the first straight portion being arranged transversely with respect to a radial direction of the stator core,
    wherein the curved portion comprises a narrower conductor width in a radial direction than a diameter of the single wire before the plastic deformation,
    wherein the curved portion comprises a narrower conductor width when viewed in an axial direction of the stator core than a diameter of the first straight portion and a diameter of the second straight portion.

2. The motor connecting member according to claim 1, wherein the at least one curved portion of the extended portion comprises a wider conductor width in a direction perpendicular to the radial direction than the diameter of the single wire before the plastic deformation.

3. The motor connecting member according to claim 1, wherein the winding connecting portion is connected by welding to the motor winding.

4. The motor connecting member according to claim 1, wherein the extended portion is consisted essentially of an electrical conductor.

5. The motor connecting member according to claim 1, wherein the extended portion comprises an electrical conductor and an insulating member comprising a resin for coating the electrical conductor.

6. A motor device, comprising: the motor connecting member according to claim 1, and a motor in which the motor winding is connected to the winding connecting portion.

* * * * *